US010399451B2

(12) United States Patent
Zaki et al.

(10) Patent No.: US 10,399,451 B2
(45) Date of Patent: Sep. 3, 2019

(54) METHOD FOR PREPARING THE SUPPLY OF POWER TO A VEHICLE WHERE A VOLTAGE LEVEL OF THE POWER IS DECIDED BY COMMUNICATION BETWEEN THE SUPPLY APPARATUS AND THE SUPPLY DEVICE

(71) Applicant: AUDI AG, Ingolstadt (DE)

(72) Inventors: Sami Robert Zaki, Abensberg (DE); Niklas Schalli, München (DE)

(73) Assignee: AUDI AG, Ingolstadt (DE)

( * ) Notice: Subject to any disclaimer, the term of this patent is extended or adjusted under 35 U.S.C. 154(b) by 59 days.

(21) Appl. No.: 14/396,258

(22) PCT Filed: Apr. 18, 2013

(86) PCT No.: PCT/EP2013/001148
§ 371 (c)(1),
(2) Date: Oct. 22, 2014

(87) PCT Pub. No.: WO2013/159882
PCT Pub. Date: Oct. 31, 2013

(65) Prior Publication Data
US 2015/0123610 A1    May 7, 2015

(30) Foreign Application Priority Data

Apr. 23, 2012    (DE) .......................... 10 2012 007 906

(51) Int. Cl.
*B60L 11/18*    (2006.01)
*B60L 3/00*    (2019.01)
(Continued)

(52) U.S. Cl.
CPC ............ *B60L 11/185* (2013.01); *B60L 3/0046* (2013.01); *B60L 3/04* (2013.01); *B60L 53/11* (2019.02);
(Continued)

(58) Field of Classification Search
CPC ........ B60L 11/185; B60L 3/0046; B60L 3/04; B60L 11/1846; B60L 11/1818
(Continued)

(56) References Cited

U.S. PATENT DOCUMENTS 4,024,415 A * 5/1977 Matsuura ......... G01R 19/16519
320/148
5,204,611 A * 4/1993 Nor ....................... H02J 7/0086
320/145
(Continued)

FOREIGN PATENT DOCUMENTS

DE    102009025302    12/2010
DE    102009025303    12/2010
(Continued)

OTHER PUBLICATIONS

"Sensors—How Potentiometer works," rdes27@gmail.com, published Aug. 2008, Accessed Online Sep. 2, 2016, http://sensors-actuators-info.blogspot.com/2009/08/potentiometer.html.*
(Continued)

*Primary Examiner* — Robert Grant
*Assistant Examiner* — John T Trischler
(74) *Attorney, Agent, or Firm* — Henry M. Feiereisen LLC

(57) ABSTRACT

A method for preparing the supply of electrical power to a vehicle having a supply device from a supply apparatus providing at least a supply voltage, wherein the vehicle and the supply apparatus are separate from one another and releasably electrically connectable to one another by a plug contact disposed in a line between the supply device of the vehicle and the supply apparatus. While preparing the supply of electrical power and after the supply device of the vehicle has been electrically connected to the supply apparatus connected by way of the plug contact, a specific voltage identifying the voltage class of the vehicle is determined. The supply apparatus reports back the determined voltage class to the supply device of the vehicle via a power line communication.

6 Claims, 3 Drawing Sheets

(51) Int. Cl.
*B60L 3/04* (2006.01)
*B60L 53/16* (2019.01)
*B60L 53/65* (2019.01)
*B60L 53/10* (2019.01)

(52) U.S. Cl.
CPC .............. *B60L 53/16* (2019.02); *B60L 53/65* (2019.02); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/169* (2013.01); *Y04S 30/14* (2013.01)

(58) Field of Classification Search
USPC ......................................................... 320/109
See application file for complete search history.

(56) References Cited

U.S. PATENT DOCUMENTS

| | | | |
|---|---|---|---|
| 5,206,578 A * | 4/1993 | Nor .................... | G01R 31/3658 320/118 |
| 5,343,970 A * | 9/1994 | Severinsky ............ | B60K 6/387 180/65.25 |
| 5,422,624 A * | 6/1995 | Smith ................. | B60L 11/1818 320/109 |
| 5,548,200 A * | 8/1996 | Nor ...................... | B60L 11/184 320/106 |
| 5,594,318 A * | 1/1997 | Nor .................... | B60L 11/1816 320/108 |
| 5,648,754 A * | 7/1997 | Hwang ............... | B60R 25/1004 180/287 |
| 5,717,374 A * | 2/1998 | Smith ................. | B60L 11/1818 141/94 |
| 5,803,215 A | 9/1998 | Henze et al. | |
| 6,018,293 A * | 1/2000 | Smith ................. | B60L 11/1824 320/109 |
| 6,067,008 A * | 5/2000 | Smith ................. | B60L 11/1824 320/109 |
| 6,727,809 B1 * | 4/2004 | Smith .................... | G01C 21/26 320/109 |
| 6,794,849 B2 * | 9/2004 | Mori .................. | G01R 31/3648 320/107 |
| 7,528,584 B2 * | 5/2009 | Regazzi .............. | H02M 7/2173 320/104 |
| 7,688,024 B2 * | 3/2010 | Kamaga ................ | B60L 3/0069 180/65.21 |
| 8,321,081 B2 * | 11/2012 | Nakamura ................ | B60L 3/00 701/22 |
| 8,350,527 B2 * | 1/2013 | Ichikawa ............ | B60L 11/1816 320/104 |
| 8,405,347 B2 * | 3/2013 | Gale ................... | B60L 11/1868 320/109 |
| 8,466,655 B2 * | 6/2013 | Mitsutani .............. | B60K 6/445 320/104 |
| 8,466,656 B2 * | 6/2013 | Hooker ................ | B60L 3/0046 320/109 |
| 8,551,636 B2 | 10/2013 | Schalli | |
| 8,890,473 B2 * | 11/2014 | Muller ..................... | B60L 3/04 320/109 |
| 8,916,811 B2 * | 12/2014 | Miller .................... | G01S 19/14 250/203.4 |
| 9,000,721 B2 * | 4/2015 | Hernandez .......... | B60L 11/1824 307/10.1 |
| 9,024,579 B2 * | 5/2015 | Igata ........................ | H02J 7/02 320/109 |
| 9,073,446 B2 * | 7/2015 | Hani .................... | B60L 3/0069 |
| 9,090,174 B2 * | 7/2015 | Nosaka ............... | B60L 11/1816 |
| 9,118,183 B2 * | 8/2015 | Erger ........................ | H02J 7/00 |
| 9,162,583 B2 * | 10/2015 | Ichikawa ............ | B60L 11/1816 |
| 9,178,381 B2 * | 11/2015 | Ishida .................... | B60L 3/0046 |
| 9,227,519 B2 * | 1/2016 | Heuer .................. | B60L 11/1818 |
| 9,278,624 B2 * | 3/2016 | Kinomura ............... | B60L 11/1818 |
| 9,475,393 B2 * | 10/2016 | Hooker | |
| 9,533,635 B2 * | 1/2017 | Nobauer ................ | H04B 3/548 |
| 9,656,558 B2 * | 5/2017 | Weber .................... | H02J 7/022 |
| 9,688,156 B2 * | 6/2017 | Heuer ................ | B60L 11/1818 |
| 10,236,705 B2 * | 3/2019 | Wu ........................ | H02J 7/007 |
| 2003/0137277 A1 * | 7/2003 | Mori .................. | G01R 31/3648 320/132 |
| 2008/0084179 A1 * | 4/2008 | Emori .................... | H02J 7/0016 320/109 |
| 2008/0204030 A1 * | 8/2008 | Brown .................. | G06Q 30/02 324/426 |
| 2009/0166142 A1 * | 7/2009 | Hyun .................. | H02K 7/1869 191/2 |
| 2009/0295399 A1 * | 12/2009 | Ueda .................. | B60L 11/1859 324/429 |
| 2010/0141205 A1 * | 6/2010 | Tyler .................... | B60L 11/1816 320/109 |
| 2010/0289498 A1 * | 11/2010 | Brown .................. | G06Q 30/02 324/426 |
| 2011/0029146 A1 * | 2/2011 | Muller ............... | B60L 11/1816 700/293 |
| 2011/0144823 A1 * | 6/2011 | Muller ..................... | B60L 3/04 700/297 |
| 2011/0169447 A1 * | 7/2011 | Brown ................. | B60L 3/0069 320/109 |
| 2011/0285350 A1 * | 11/2011 | Mitsutani ............... | B60K 6/445 320/109 |
| 2012/0029728 A1 * | 2/2012 | Hirayama ............ | B60L 11/1838 701/1 |
| 2012/0091954 A1 * | 4/2012 | Matsuki ................ | B60L 3/0023 320/109 |
| 2012/0091961 A1 * | 4/2012 | Hani ..................... | B60L 3/0069 320/109 |
| 2012/0098487 A1 * | 4/2012 | Hooker ................ | B60L 3/0046 320/109 |
| 2012/0112697 A1 * | 5/2012 | Heuer .................. | B60L 11/1818 320/109 |
| 2012/0119701 A1 * | 5/2012 | Igata ........................ | H02J 7/02 320/109 |
| 2012/0139489 A1 | 6/2012 | Gaul et al. | |
| 2012/0277945 A1 * | 11/2012 | Ichikawa ............ | B60L 11/1816 701/22 |
| 2013/0002197 A1 * | 1/2013 | Hernandez .......... | B60L 11/1824 320/109 |
| 2013/0063086 A1 * | 3/2013 | Hooker ................ | B60L 3/0046 320/109 |
| 2013/0065095 A1 | 3/2013 | Schalli | |
| 2013/0119947 A1 * | 5/2013 | Ishida .................... | B60L 3/0046 320/162 |
| 2013/0193932 A1 | 8/2013 | Schalli | |
| 2013/0207608 A1 * | 8/2013 | Kawashima .......... | H01M 10/44 320/109 |
| 2013/0257345 A1 * | 10/2013 | Nosaka ............... | B60L 11/1816 320/106 |
| 2013/0314034 A1 * | 11/2013 | Ang ....................... | B60W 20/00 320/107 |
| 2013/0314039 A1 * | 11/2013 | Weber .................... | H02J 7/022 320/109 |
| 2014/0036989 A1 * | 2/2014 | Heinrich ............. | B60L 11/1818 375/238 |
| 2014/0091763 A1 * | 4/2014 | Thommes .............. | H02H 3/167 320/109 |
| 2014/0091764 A1 * | 4/2014 | Kinomura ............ | B60L 11/1818 320/109 |
| 2014/0159659 A1 * | 6/2014 | Nosaka ............... | B60L 11/1838 320/109 |
| 2014/0167691 A1 * | 6/2014 | Kamaga ............... | B60L 11/1838 320/109 |
| 2014/0375265 A1 * | 12/2014 | Koyama ............... | B60L 11/1816 320/109 |
| 2015/0108947 A1 * | 4/2015 | Heuer ................ | B60L 11/1818 320/109 |
| 2015/0274024 A1 * | 10/2015 | Da Costa ............ | B60L 15/007 320/109 |
| 2015/0321627 A1 * | 11/2015 | Nobauer ................ | H04B 3/548 307/10.1 |

(56) References Cited

U.S. PATENT DOCUMENTS

| | | | | |
|---|---|---|---|---|
| 2016/0101704 A1* | 4/2016 | McCalmont | ........ | B60L 11/1809 |
| | | | | 320/101 |
| 2018/0102706 A1* | 4/2018 | Gao | ...................... | H02M 3/155 |
| 2018/0138721 A1* | 5/2018 | Wu | ........................ | H02J 7/007 |
| 2018/0159416 A1* | 6/2018 | Julen | ...................... | B60L 13/03 |

FOREIGN PATENT DOCUMENTS

| | | | | |
|---|---|---|---|---|
| DE | 102009026936 | | 12/2010 | |
| DE | 102010045686 | | 3/2012 | |
| DE | 202010014316 | | 3/2012 | |
| EP | 2279896 A2 * | | 2/2011 | .......... B60L 11/1816 |
| EP | 2279896 A2 | | 2/2011 | |
| JP | 2011259602 A * | | 12/2011 | |
| TW | 2011 08560 A1 | | 3/2011 | |
| WO | WO-2010145898 A1 * | | 12/2010 | |
| WO | WO 2011/006775 | | 1/2011 | |
| WO | WO 2011098860 A2 * | | 8/2011 | .......... B60L 11/1816 |
| WO | WO-2011098860 A2 * | | 8/2011 | |

OTHER PUBLICATIONS

International Search Report issued by the European Patent Office in International Application PCT/EP2012/001148 dated Sep. 9, 2013.
Standard J1772, SAE, pp. 34 and36, Jan. 2010.
Chinese Search Report dated Dec. 22, 2015 with respect to counterpart Chinese patent application 2013800330217.7.
Translation of Chinese Search Report dated Dec. 22, 2015 with respect to counterpart Chinese patent application 2013800330217.7.

* cited by examiner

METHOD FOR PREPARING THE SUPPLY OF POWER TO A VEHICLE WHERE A VOLTAGE LEVEL OF THE POWER IS DECIDED BY COMMUNICATION BETWEEN THE SUPPLY APPARATUS AND THE SUPPLY DEVICE

CROSS-REFERENCES TO RELATED APPLICATIONS

This application is the U.S. National Stage of International Application No. PCT/EP2013/001148, filed Apr. 18, 2013, which designated the United States and has been published as International Publication No. WO 2013/159882 and which claims the priority of German Patent Application, Serial No. 10 2012 007 906.0, filed Apr. 23, 2012, pursuant to 35 U.S.C. 119(a)-(d).

BACKGROUND OF THE INVENTION

The invention relates to a method for preparing the supply of electric power to a vehicle having a supply device, in particular an electric or a hybrid vehicle, with a supply apparatus supplying at least one supply voltage, wherein the vehicle and the supply apparatus are constructed separate from one another and can be releasably connected by a plug contact between the supply device of vehicle and the supply apparatus.

To rapidly supply an electrical or a hybrid vehicle with electrical energy, for example to rapidly charge an energy storage device of the vehicle, for example a battery, rapid delivery devices, so-called charging devices or rapid charging devices exist which are mostly configured as a charging station.

For example, conventional DC rapid charging stations have an output voltage range of 0 to 1500V DC, i.e. they are able to provide charging voltages between 0 and 1500V as DC voltage. For charging a battery of an electric vehicle, the electric vehicle and the DC rapid charging station are electrically connected together, for example, via a plug contact. FIG. 1 shows schematically such electrical connection or arrangement.

The DC rapid charging station 1 has a plug 2 connected to an AC/DC converter 3 and a PLC-component 4. The AC/DC converter 3 is in turn connected to a mains connection N.

The electric vehicle 5 includes a charging socket 6 cooperating with the plug 2, wherein the charging socket 6 is connected via HV lines HV+ and HV− (HV=high voltage) with a HV-plug device 7. The HV-plug device 7 is connected via circuit breakers K1 and K2 to the battery 8 to be charged. Furthermore, the charging socket 6 is connected with a PLC-component 9 of the vehicle. As an additional hardware-line, the so-called PRX-line 10 or proximity-line is connected on the vehicle side.

For charging the battery 8, the electric vehicle 5 notifies the battery 8 of vehicle 5 during an initialization phase of the DC charging process via power-line communication (PLC=power line communication) of the DC rapid charging station 1 about the maximum permissible charging voltage and the target voltage, i.e. the voltage level to be attained after charging is complete. The DC rapid charging station 1 then sets the desired charging voltage for the vehicle 5 accordingly. The vehicle 5 recognizes or measures the applied charging voltage with a voltmeter $V_1$ and closes the vehicle-side circuit breakers K1 and K2, when the applied voltage corresponds to the requested charging voltage.

Disadvantageously, when communicating via PLC between a charging station or a supply device and a vehicle, the communication is not classified as safety-relevant. Errors in the communication between the charging station and the vehicle or errors in the charging station itself can cause the charging station to output or apply to the vehicle an exceedingly high charging voltage, for example 1500 V, although a lower charging voltage has been requested.

Therefore, the components of the vehicle 5 used for charging the battery 8 must be designed for safety reasons for a voltage of 1500V. However, components used in vehicles typically do not have this dielectric strength. The typical voltage range for a battery 8 is maximally 500V. The vehicle-side HV lines HV+ and HV− are typically designed for a voltage range of maximally 600V. The vehicle-side circuit breakers K1 and K2 as well as the vehicle-side HV-plug device 7 are typically designed for a voltage range of maximally 850V.

Designing the aforementioned components for maximally 1500V not only increases the costs and the weight of the vehicle, but a corresponding installation space in the vehicle for the corresponding voluminous components is also needed.

DE 10 2009 025 303 A1 describes a method for communicating with an electric vehicle, including generating a first predetermined DC level on a pilot conductor, identifying the existence an electrical connection with an electric vehicle by measuring a second predetermined DC level on the pilot conductor, emitting a trigger signal on the pilot conductor, measuring a vehicle identification signal on the pilot conductor and unblocking the power supply on a power conductor.

U.S. Pat. No. 5,548,200 discloses a charging station as well as a method for charging a battery of a vehicle, wherein the charging power can be supplied to the battery of electric vehicle regardless of the type of the charging controller installed in the vehicle and associated with the electric vehicle battery.

SUMMARY OF THE INVENTION

It is the object of the invention to provide a method of the aforementioned type so that the communication between a supply device of a vehicle and an electrical supply apparatus can be improved.

According to the invention, this object is attained by a method for preparing an electrical energy supply of a vehicle having a supply device with at least one supply apparatus supplying a supply voltage, wherein the vehicle and the supply apparatus are implemented separate from one another and are electrically detachably connectable by a plug-in contact between the supply device of the vehicle and the supply apparatus, wherein in the course of the preparation of the energy supply and subsequent to the electrical connection between the supply device of vehicle and the supply apparatus, the supply apparatus determines by way of a first communication path in the form of a line that is closed by the plug contact a defined voltage characterizing the voltage class of vehicle and identifies the voltage class of vehicle based on the determined defined voltage, and wherein the supply apparatus reports back the determined voltage class to the supply device of the vehicle via a second communication path in the form of a power-line communication.

According to the invention, there is no longer only a single communication path available between the supply apparatus and the supply device of vehicle, but a second or alternative communication in the form a hardware line is available in addition to the power-line communication. In this way, it can ensured that through bidirectional communication on two different communication paths a vehicle is supplied with the requested supply voltage and/or the supply operation can be prevented when information is contradictory. Consequently, the equipment of vehicles, in particular components of a supply device of the vehicle, need not be oversized in order to prevent damage to the components when an error occurs during application of the supply voltage.

According to an embodiment of the invention, the supply device of the vehicle transmits to the supply apparatus via the power-line communication the value of the maximum supply voltage to be applied to the energy supply of the vehicle, whereafter the supply apparatus compares the maximum value of the supply voltage associated with the identified voltage class to be applied to energy supply of vehicle, and the supply apparatus in the preparation phase of the energy supply allows the power supply operation to continue, when the maximum value of the supply voltage associated with the identified voltage class is less than or equal to the transmitted value of the maximum permissible supply voltage to be applied to the energy supply of vehicle. In this way, application of an excessively high supply voltage is already prevented on the side of the supply device.

According to another embodiment of the invention, the electrical energy supply for charging an electrical energy storage device of vehicle is carried out. However, the electrical energy supply may also be provided to supply other components of the vehicle with electrical energy, for example a device for climate control of the interior of the vehicle.

According to a variant of the invention, the voltage characterizing the voltage class of the vehicle is generated on the vehicle side by a voltage source of the supply device of the vehicle.

Alternatively, according to another variant of the invention, the defined voltage characterizing the voltage class of the vehicle is generated by the voltage drop across a voltage divider having resistors.

According to an embodiment of the invention, the vehicle-side section of the line is formed by a proximity-line of the supply device of vehicle. This proximity-line is contacted with a connecting line of the supply apparatus when the supply device of the vehicle is connected to the supply apparatus, wherein preferably a voltmeter is connected to the connecting line.

According to another variant of the invention for carrying out the method, both the supply device of the vehicle and the supply apparatus each have a controller, implemented as a program-controlled computing device.

According to an embodiment of the invention, the supply apparatus can provide several supply voltages, i.e. DC and/or AC voltages, at different voltage levels.

BRIEF DESCRIPTION OF THE DRAWING

An exemplary embodiment of the invention is shown in the accompanying schematic drawings, where.

DETAILED DESCRIPTION OF PREFERRED EMBODIMENTS

Figure 1:
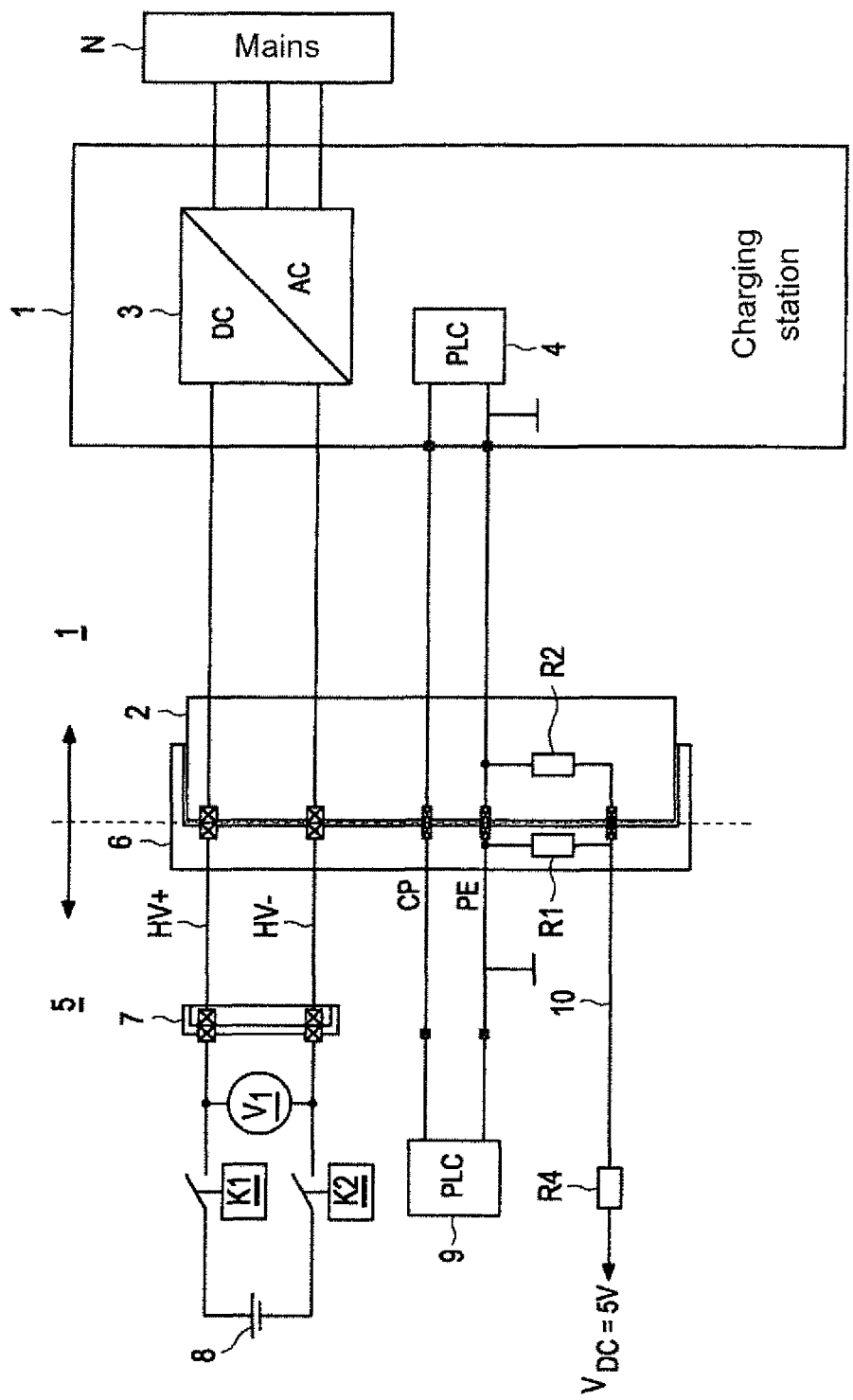
FIG. 1 shows an arrangement according to the state of the art.
Figure 2:
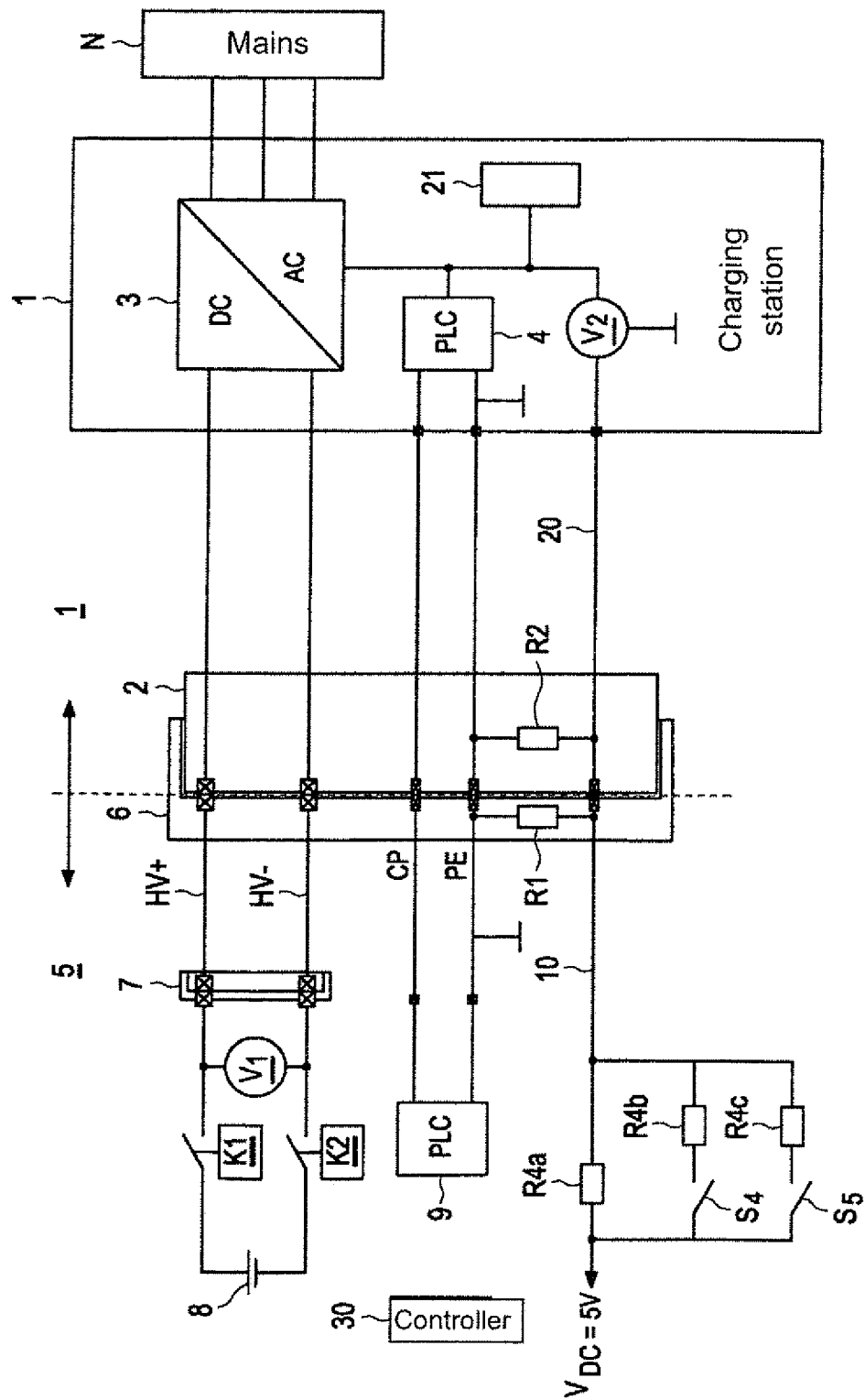
FIG. 2 shows an arrangement for carrying out the method of the invention.

The basic structure of the arrangement shown in FIG. 2 corresponds to that of the arrangement shown in FIG. 1, whereby same or identical components are designated with identical reference numerals.

In the present exemplary embodiment of the invention, the method 100 according to the invention will described in form of an example based of DC charging of an energy storage device 8 an electric vehicle 5.

The supply apparatus 1 or charging apparatus 1 is constructed in the form a charging station 1, in particular as DC rapid charging station 1, which in the present exemplary embodiment of the invention is able to provide three DC voltages or charging voltages $U_1$ of maximally 600V, $U_2$ of maximally 1000V and $U_3$ of maximally 1500V, whereby three voltage classes are defined or three classes of vehicles whose energy storage device can be charged with the charging station 1.

Unlike the arrangement shown in FIG. 1, the charging station 1 of FIG. 2 has an additional connecting line 20 as well as a voltmeter $V_2$ connected to the connecting line 20. The charging station 1 also has a controller 21 for controlling a charging operation on the side of the charging station, with cooperates with or controls the aforementioned components of the charging station 1.

Figure 3:
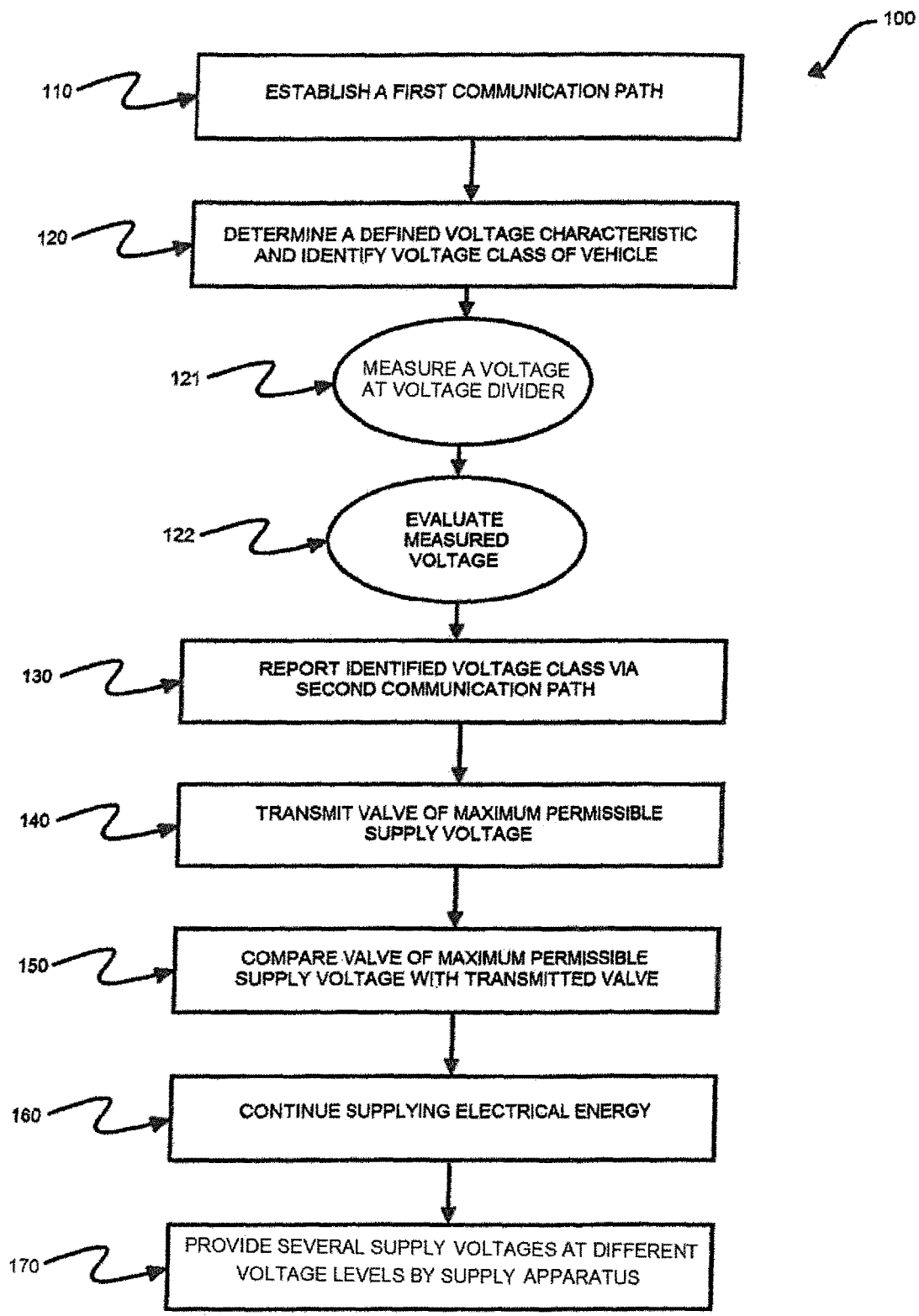
FIG. 3 shows the method steps of the invention.

The steps of method 100 of the invention, as described below, are shown in FIG. 3.

The supply device or—in the case of the present exemplary embodiment the invention—the charging device of the electric vehicle 5 includes presently the charging socket 6, the HV lines HV+, HV−, the HV plug device 7, the voltmeter $V_1$ the circuit breakers K1, K2, an energy storage device in the form of the battery 8, the PLC-component 9, the PRX-line 10 and the resistors R1, R4a, R4b and R4c. The listed components are intended only as examples for explaining the method according to the invention. For example, the circuit breakers K1 and K2 may also be constructed as different disconnect devices.

In the present exemplary embodiment of the invention, the resistors R4b and R4c are connected in parallel with the resistor R4a by way of the switches $S_4$ and $S_5$. The charging device of the electric vehicle 5 also includes a controller 30 for controlling the charging operation on the vehicle side, wherein the controller 30 cooperates with or controls the aforementioned components of the charging device of the vehicle 5.

At step 110 shown in FIG. 3, in preparation for charging the battery 8, the vehicle 5 or the charging device of the vehicle 5 and the charging station 1 are mechanically and electrically connected together via the charging socket 6 and the plug 2, thereby producing the electrical contacts shown in FIG. 2.

At step 120 shown in FIG. 3, via the PRX-line 10 and the connecting line 20, which represent a first communication path, the vehicle 5 notifies the charging station 1 or the controller 21 of the charging station 1 during the initialization phase of the charging operation of the voltage class of the vehicle 5, i.e. whether the vehicle belongs to the voltage class associated with $U_1$, $U_2$ or $U_3$. This is performed at step 121 by measuring a specific voltage present at the voltage divider formed by the defined selected resistors R1, R2 and R4a. The voltage applied to or dropping across the voltage divider can be evaluated by the controller 30 in the vehicle 5 for diagnostic purposes.

At step 122 shown in FIG. 3, the voltage applied to or dropping across the voltage divider is evaluated in the charging station 1 with the voltmeter V$_2$ under control of the controller 21. Based on the determined defined voltage, the controller 21 of the charging station 1 limits the supplied charging voltage for charging the battery 8 of the vehicle 5 to a specific charging voltage value, meaning the maximum charging voltage value of the transmitted voltage class of the vehicle 5, in the present example to the charging voltage U$_1$.

At step 130 shown in FIG. 3, via a second communication path, the PLC (Power Line Communication), the charging station 1 transmits via the PLC-component 4 and under control of the controller 21 on the side of the charging station the voltage class of vehicle 5 determined with V$_2$ back to the vehicle 5 or to the PLC components 9 of the vehicle 5 and thus to the vehicle-side controller 30.

In the present exemplary embodiment, at step 140 shown in FIG. 3, the vehicle-side controller 30 transmits thereupon via PLC to the charging station 1 or to the controller 21 on the side of the charging station the maximum permissible voltage to be applied to the charging device of the vehicle 5 for charging the battery 8.

At step 150 shown in FIG. 3, the charging station 1 or the controller 21 on the side of the charging station compares the specific charging voltage value set at the charging station 1, based on the communicated voltage class of the vehicle 5, with the maximum permissible charging voltage value transmitted via PLC from the vehicle 5 to the charging station 1 for charging the battery 8 of the vehicle 5. At step 160 shown in FIG. 3, if the specific charging voltage value set at the charging station 1 is less than or equal to the maximum permissible charging voltage value transmitted via PLC, the charging station 1 or the controller 21 on the side of the charging station unblock the charging operation of the battery 8 of the vehicle 5 with the specific charging voltage value set during the initialization phase of the charging operation. At step 170 shown in FIG. 3, supply apparatus provides several supply voltages at different voltage levels.

Conversely, if the defined charging voltage value set at the charging station 1 is greater than the voltage value of the maximum permissible charging voltage transmitted via PLC, the charging station 1 or the controller 21 on the side of the charging station prevents charging of the battery 8 of the vehicle 5.

It thus becomes clear that in the course of described method the voltage class of the vehicle 5 is communicated first based on the voltage drop across the voltage divider formed by the resistors R1, R2 and R4a. The values of the resistors R1, R2 and R4a are hence selected or are to be selected so as to allow identification of the voltage class of the vehicle. In particular, the value of the resistor R4a is different for vehicles of different voltage classes and will depend on the voltage class of the respective vehicle.

In the present exemplary embodiment of the invention, as already described above, the resistors R4a, R4b and R4c can be connected in parallel by selectively operating the switches S$_4$ and S$_5$. It can then be checked in cooperation with the charging station 1, whether the charging station 1 indeed recognizes different voltage classes when the total resistance changes and reports the result back to the vehicle accordingly. The functioning of the charging station can thus be tested in the form a safety check by selectively operating the switches S$_4$ and S$_5$. The switches S$_4$, S$_5$ are operated on the vehicle side by the controller 30.

The resistance values are selected, so that the charging station 1 must recognize the voltage class U$_1$ to max. 600V, when the switches S$_4$ and S$_5$ are open, must recognize the voltage class U$_2$ to max. 1000V, when the switch S$_4$ is closed and the switch S$_5$ is open, and must recognize the voltage class U$_3$ to max. 1500V, when the switches S$_4$ and S$_5$ are closed.

Other voltage classes of vehicles may be characterized or identified by way of additional parallel circuits of resistors. However, because a vehicle does not change its voltage class, only one defined resistor R4a with a specific resistance value can be present in the vehicle, which can then be used to determine the voltage class of the vehicle.

Alternatively, in lieu of one or more resistors on the vehicle side, a respective voltage source having a defined voltage may be provided in the vehicle for identifying the voltage class of the vehicle.

The invention has been described above for the charging a battery of a vehicle. However, the method according to the invention is not limited to charging operations of energy storage devices, example batteries or accumulators. Instead, the method according to the invention can also be used to prepare the electrical energy supply of other electrical energy consumers or components of a vehicle. For example, the method is used to prepare the electrical energy supply for climate control of the vehicle.

The invention claimed is:

1. A method comprising:

establishing an electrical connection representing a first communication path between a supply device housed in a vehicle and an external supply apparatus via a line and a plug contact, with the supply apparatus, determining via the first communication path a defined voltage characteristic of a voltage class of the vehicle and identifying the voltage class of the vehicle based on the determined defined voltage characteristic, wherein the defined voltage characterizing the voltage class of the vehicle is generated by the voltage drop across a voltage divider comprising pre-selected resistors, by measuring a voltage present at the voltage divider formed by the pre-selected resistors with a voltmeter at the supply apparatus, and evaluating the voltage applied to or dropping across the voltage divider by a controller located in the supply device of the vehicle, with the supply apparatus, reporting the identified voltage class back to the supply device of the vehicle via a second communication path in the form of a power-line communication, and supplying electrical energy to the vehicle from the supply apparatus, wherein the supplied electrical energy charges an electrical energy storage device of the vehicle based on the voltage class of the vehicle, wherein the voltage class is a maximum of 600V or a maximum of 1000V or a maximum of 1500V.

2. The method of claim 1, further comprising:

transmitting from the supply device of the vehicle to the supply apparatus via the power-line communication a value of a maximum permissible supply voltage to be applied for supplying energy to the vehicle, comparing with the supply apparatus the value of a maximum permissible supply voltage associated with the identified voltage class with the transmitted value of the maximum permissible supply voltage to be applied for supplying energy to the vehicle, and allowing the supply apparatus, to continue supplying the electrical energy to the supply device and/or other components of the vehicle, when the maximum value of the supply voltage associated with the identified voltage class is less than or equal to the transmitted maximum permissible value of the supply voltage for supplying energy to the vehicle.

3. The method of claim 1, wherein the defined voltage characteristic of the voltage class of the vehicle is generated on the vehicle side by a voltage source of the supply device of the vehicle.

4. The method of claim 1, wherein a section of the line disposed on a vehicle side is formed by a proximity-line of the supply device of the vehicle.

5. The method of claim 1, wherein the supply apparatus comprises a controller.

6. The method of claim 1, wherein the supply apparatus is configured to provide several charging voltages having different voltage levels.

* * * * *